United States Patent
Yamane et al.

(10) Patent No.: US 12,226,838 B2
(45) Date of Patent: Feb. 18, 2025

(54) MECHANISM FOR ATTACHING TOOL HOLDER TO TURRET

(71) Applicant: DMG MORI CO., LTD., Yamatokoriyama (JP)

(72) Inventors: Masahiro Yamane, Yamatokoriyama (JP); Toshio Ueda, Yamatokoriyama (JP); Tomoyuki Mineshige, Yamatokoriyama (JP)

(73) Assignee: DMG MORI CO., LTD., Yamatokoriyama (JP)

( * ) Notice: Subject to any disclaimer, the term of this patent is extended or adjusted under 35 U.S.C. 154(b) by 483 days.

(21) Appl. No.: 17/780,366

(22) PCT Filed: Nov. 18, 2020

(86) PCT No.: PCT/JP2020/043071
§ 371 (c)(1),
(2) Date: May 26, 2022

(87) PCT Pub. No.: WO2021/106725
PCT Pub. Date: Jun. 3, 2021

(65) Prior Publication Data
US 2022/0410279 A1    Dec. 29, 2022

(30) Foreign Application Priority Data
Nov. 29, 2019    (JP) .................................. 2019-216550

(51) Int. Cl.
B23B 29/24    (2006.01)
(52) U.S. Cl.
CPC .................... B23B 29/24 (2013.01)
(58) Field of Classification Search
CPC ....... B23B 29/20; B23B 29/24; B23B 29/242; B23B 29/244; B23B 29/246;
(Continued)

(56) References Cited

U.S. PATENT DOCUMENTS 8,578,622 B2    11/2013 Sahm
2011/0094355 A1    4/2011 Sheehy et al.
(Continued)

FOREIGN PATENT DOCUMENTS

DE    41 39 573 A1    6/1993
DE    10 2008 048206 A1    4/2010
(Continued)

OTHER PUBLICATIONS

International Search Report for PCT/JP2020/043071 dated Dec. 15, 2020, 5 pages.
(Continued)

*Primary Examiner* — Sunil K Singh
*Assistant Examiner* — Hector Gustavo Guerrero
(74) *Attorney, Agent, or Firm* — NIXON & VANDERHYE P.C.

(57) ABSTRACT

An angle adjustment mechanism includes an angle adjustment block including first opposing side faces inclined relative to the direction along the rotation axis of the turret; first and second adjustment blocks having inclined faces that are brought into surface contact with respective first opposing side faces, and movable in a direction along the rotation axis; a depression formed in a tool holder, and accommodates the angle adjustment block with the first and second adjustment blocks; first and second adjusters that move the first and second adjustment blocks in a direction along the rotation axis of the turret; and a first positioning member conducting positioning between the turret and the tool holder, and a second positioning member conducting positioning between the turret and the angle adjustment block. This configuration provides a mechanism for attaching a tool holder to a turret which can easily conduct highly precise angle adjustment.

6 Claims, 11 Drawing Sheets

(58) Field of Classification Search
CPC ... B23B 29/248; B23B 2260/146; B23Q 3/18; B23Q 3/186; Y10T 82/2587
See application file for complete search history.

(56) References Cited

U.S. PATENT DOCUMENTS

| | | |
|---|---|---|
| 2012/0131809 A1 | 5/2012 | Sahm |
| 2014/0133903 A1 | 5/2014 | Jansen |
| 2016/0175943 A1 | 6/2016 | Judas et al. |

FOREIGN PATENT DOCUMENTS

| | | |
|---|---|---|
| DE | 10 2010 022435 A1 | 12/2011 |
| DE | 10 2011 078445 A1 | 1/2013 |
| JP | 2001-79701 | 3/2001 |
| JP | 2016-117153 | 6/2016 |
| JP | 2017-77622 | 4/2017 |

OTHER PUBLICATIONS

Written Opinion of the ISA for PCT/JP2020/043071 dated Dec. 15, 2020, 3 pages.
European Search Report dated Dec. 12, 2023 issued in European Patent Application No. 20894035.3, 6 pp.

MECHANISM FOR ATTACHING TOOL HOLDER TO TURRET

This application is the U.S. national phase of International Application No. PCT/JP2020/043071 filed Nov. 18, 2020 which designated the U.S. and claims priority to JP Patent Application No. 2019-216550 filed Nov. 29, 2019, the entire contents of each of which are hereby incorporated by reference.

TECHNICAL FIELD

The present disclosure relates to a mechanism for attaching a tool holder to a turret.

BACKGROUND ART

NC machine tools such as an NC lathe holding a rotatable tool rest called turret, are configured such that a tool holder is attached to a plurality of turret-side attachment faces formed and arranged along the outer peripheral surfaces of the turret, and tools with various functions are removably attached to the tool holder.

To precisely machine the workpiece attached to the spindle, the attachment has to be in such a manner that the axis of the tool attached to the tool holder be parallel with the rotation axis of the turret. It is because when an angle is formed between the rotation axis of the tool and the rotation axis of the turret, there are disadvantages such as the following: the tools are damaged at the time of machining, and the workpiece to be machined is off-positioned at the time of machining Therefore, attachment posture of the tool holder to the turret is very important.

Conventionally, a tool holder temporally fixed to the turret is hit with a hammer to fine-tune the mounting posture of the tool holder, and thereafter, the tool holder is firmly fixed; therefore, to facilitate such angle adjustment, there has been proposed various attachment mechanisms such as the following including Patent Document 1 described below.

FIGS. 10(a) and (b) and FIGS. 11(a), (b), and (c) show the attachment mechanism disclosed in Patent Document 1.

The attachment mechanism has a pair of depressions 48,48 provided at the turret 12 side, and projections 22 provided at the tool holder 10, and configured such that the guide surface formed at the depressions 48,48 is fitted with the guide surface formed at the projections 22.

To be specific, a pair of depressions 48,48 are formed linearly in parallel at left-right ends of the contact surface 18 of the turret 12 in the rotation axis direction P of the turret 12; a pair of receiving surfaces 44,44 are formed below the tool holder 10 at a near side and a far side thereof in the rotation axis direction P of the turret 12; an alignment body 30 is fastened and fixed attachably and detachably to the receiving surfaces 44,44 using a bolt 42; and projections 22 are formed in the alignment body 30 to conduct positioning with the depressions 48,48.

In the alignment body 30, a pair of strips 34, 36 are connected at the lower bridge 40, and a groove 38 that separates the strips 34 and 36 is formed at an upper side of the bridge 40. The strip 34 abuts against the receiving surfaces 44 when fastened and fixed with the bolts 42 (ref: FIGS. 10(a) and (b)).

By inserting the retaining part 56 projected downward from the attachment face 16 of the tool holder 10 side to the opening 62 formed at the contact surface 18 of the turret 12 side, and fastening the bolt inserted from the near side of the turret 12 to screw on the toothed surface 58 formed at the retaining part 56, the tool holder 10 is pulled downward to bring the attachment faces 16, 18 to closely contact with each other. The configuration is in conformity with DIN 69880 of German Industrial Standard.

The process allows the alignment part 24 formed at the depressions 48,48 to abut with the alignment part formed at the projection 22, and the projection is pushed up to cause the strip 36 to elastically deform to the receiving face 44 side via the bridge 40, and the stress allows the aligned position to be held (Ref: FIGS. 11(a), (b), and (c)).

The reference numerals used in FIGS. 10(a), (b) and FIGS. 11(a), (b), (c) are the reference numerals used in Figures attached to Patent Document 1, and unrelated to the reference numerals referred to in Figures with reference to Embodiments described later in the present disclosure.

CITATION LIST

Patent Document

Patent Document 1: U.S. Pat. No. 8,578,622

SUMMARY OF THE INVENTION

Problem to be Solved by the Invention

When the attachment mechanism described in Patent Document 1 is used, preciseness of the attachment position of the tool holder 10 depends on the attachment precision of the position adjustment member 30 relative to the pair of receiving surfaces 44,44 previously formed to the tool holder 10, and preciseness of the depressions 48,48 formed at the turret 12 side, and errors are caused at least from tolerances of the parts.

Therefore, there has been problems in that the attachment position of the alignment bodies 30,30 to the receiving surfaces 44 included in the tool holder 10 has to be fine-tuned in advance, necessitating troublesome extra steps.

The present disclosure aims to provide a mechanism for attaching a tool holder to a turret, which enables highly precise angle adjustment easily.

Means for Solving the Problem

To achieve the aim, a mechanism for attaching a tool holder to a turret of the present disclosure includes an angle adjustment mechanism and a fixing mechanism that fixes the tool holder to the turret, wherein the angle adjustment mechanism includes: an angle adjustment block composed of a prism including first opposing side faces inclined relative to a direction along the rotation axis of the turret in plan view, and second opposing side faces parallel to each other; first and second adjustment blocks disposed to sandwich the angle adjustment block in plan view, include inclined faces that are brought into surface contact with respective first opposing side faces, and composed of prisms that are movable in directions along the rotation axis of the turret; a depression formed in the tool holder, configured so that the angle adjustment block is movable, and includes a guide face opposing one of the second opposing side faces of the angle adjustment block, and a pair of guide faces with which the first and second adjustment blocks are movable in a direction crossing an arrangement direction of the first and second adjustment blocks while being in contact with the opposing faces of the inclined faces of the first and second adjustment blocks; first and second adjusters that move the first and second adjustment blocks in a direction along the rotation axis of the turret while the angle adjustment block and the first and second adjustment blocks are accommodated in the depression, a first positioning member conducting positioning between the turret and the tool holder, and a second positioning member conducting positioning between the turret and the angle adjustment block.

Effects of the Invention

The present disclosure can provide a mechanism for attaching a tool holder to a turret, which can easily achieve highly precise angle adjustment.

While the novel features of the present disclosure are set forth in the appended claims, the present disclosure, both as to organization and content, will be better understood, along with other objects and features thereof, from the following detailed description taken in conjunction with the drawings.

DESCRIPTION OF THE EMBODIMENTS

Figure 1:
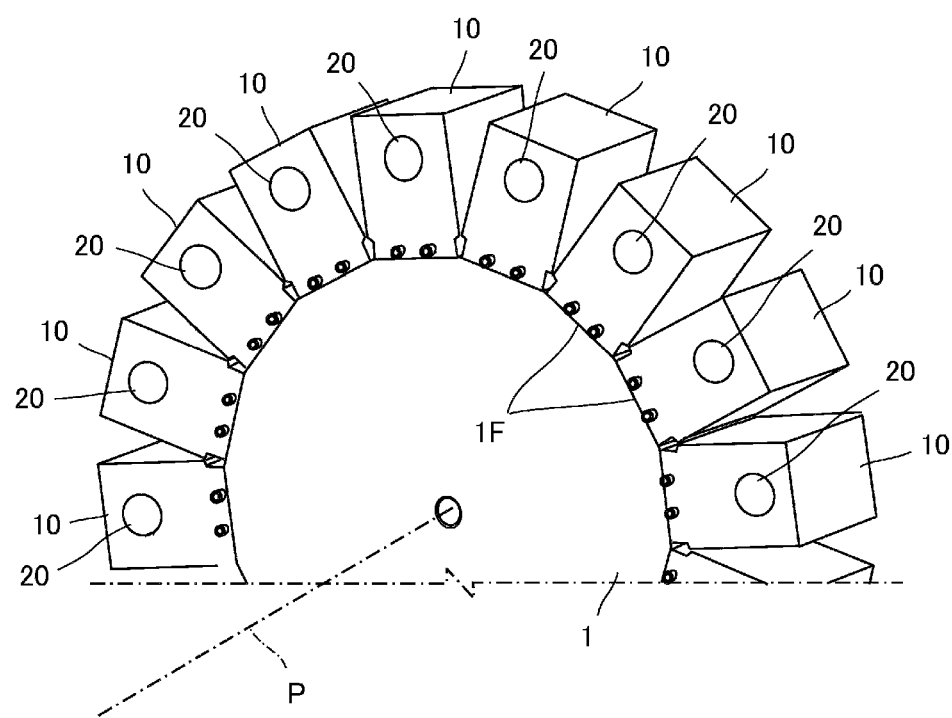
FIG. 1 illustrates an essential portion of a turret with a tool holder attached thereto.

[Basic Example of Mechanism for Attaching Tool Holder to Turret]

In the following, concepts of the mechanism for attaching a tool holder to a turret of the present disclosure is described before describing specific Examples.

A first characteristic configuration of the mechanism for attaching a tool holder to a turret includes an angle adjustment mechanism and a fixing mechanism that fixes the tool holder to the turret, wherein the angle adjustment mechanism includes: an angle adjustment block composed of a prism including first opposing side faces inclined relative to a direction along the rotation axis of the turret in plan view, and second opposing side faces parallel to each other; first and second adjustment blocks composed of prisms, wherein the prisms are disposed to sandwich the angle adjustment block in plan view, include inclined faces that are brought into surface contact with respective first opposing side faces, and movable in directions along the rotation axis of the turret; a depression formed in the tool holder, configured so that the angle adjustment block is movable, and includes a guide face opposing one of the second opposing side face of the angle adjustment block, and a pair of guide faces with which the first and second adjustment blocks are movable in a direction crossing an arrangement direction of the first and second adjustment blocks while being in contact with the opposing faces of the inclined faces of the first and second adjustment blocks; first and second adjusters that move the first and second adjustment blocks in a direction along the rotation axis of the turret while the angle adjustment block and the first and second adjustment blocks are accommodated in the depression; a first positioning member conducting positioning between the turret and the tool holder, and a second positioning member conducting positioning between the turret and the angle adjustment block.

While the turret and the tool holder are positioned by the first positioning member, and the turret and the angle adjustment block are positioned by the second positioning member, the first and second adjusters are operated to move the first and second adjustment blocks along the guide face formed in the depression, the angle adjustment block moves relative to the tool holder.

By the relative movement of the tool holder positioned to the turret with the first positioning member, and the angle adjustment block positioned to the turret by the second positioning member, the orientation of the tool holder relative to the turret is adjusted. While in that state, the tool holder is fixed to the turret through the fixing mechanism. As a result, the axis of the tool fixed to the tool holder is adjusted precisely in a direction along the rotation axis of the turret.

In the second characteristic configuration, in addition to the first characteristic configuration, the second opposing side faces of the angle adjustment block include a first guide face and a second guide face that are orthogonally orientated relative to the rotation axis of the turret in plan view; the first opposing side faces include a first inclined face and a second inclined face that incline in opposite directions between the first guide face and the second guide face; the first adjustment block includes a third opposing side face including a third inclined face relatively movable while being in surface contact with the first inclined face, and a third guide face parallelly oriented relative to the rotation axis of the turret; the second adjustment block includes a fourth opposing side face including a fourth inclined face relatively movable while being in surface contact with the second inclined face, and a fourth guide face parallelly oriented relative to the rotation axis of the turret; and the depression includes a fifth guide face opposing the first guide face of the angle adjustment block, a sixth guide face opposing the second guide face of the angle adjustment block, a seventh guide face relatively movable while being in surface contact with the third guide face of the first adjustment block, and an eighth guide face relatively movable while being in surface contact with the fourth guide face of the second adjustment block.

In the third characteristic configuration, in addition to the above-described second characteristic configuration, the first and second adjusters are configured with a female screw portion and a male screw, wherein the female screw portion is formed at the first and second adjustment blocks, and the male screw is screwed in the female screw portion through the first and second adjustment holes formed at one face of the tool holder, and an energizing mechanism that energizes the first and second adjustment blocks in a direction along the seventh guide face or eighth guide face is included.

In the fourth characteristic configuration, in addition to the above-described third characteristic configuration, the one face of the tool holder where the first and second adjustment holes are formed corresponds to a front side face or rear side face of the turret, and this allows easy operation of the first and second adjusters.

In the fifth characteristic configuration, in addition to one of the above-described first to fourth characteristic configurations, a pair of the angle adjustment mechanisms are provided in the tool holder along a direction parallel to the rotation axis of the turret, and the first positioning member also works as the second positioning member.

In the sixth characteristic configuration, in addition to one of the above-described first to fifth characteristic configurations, the first and second positioning members are composed of a depression and a projection: the depression having a circle shape in cross sectional view and included at one attachment face side of an object to be positioned and the projection having a circle shape in cross sectional view and included at the other attachment face side to be fitted in the depression.

[Detailed Embodiment of Mechanism for Attaching Tool Holder to Turret]

In the following, a specific structure of the mechanism for attaching a tool holder to a turret of the present disclosure is described.

FIG. 1 shows a turret 1, a rotatable tool rest included in an NC machine tool such as an NC lathe, with tool holders 10 attached to a plurality of turret-side attachment faces 1F formed and arranged along the outer perimeter of the turret 1.

A rotation tool can be attached to a tool insertion opening 20 formed in the tool holder 10. For example, a configuration can be made to include a bevel gear mechanism in the tool holder 10, the bevel gear mechanism drivingly connected to the rotation axis extending in the radial direction from an electric motor installed in the turret 1, and a rotation tool inserted in the tool insertion opening 20 is rotated through the bevel gear mechanism.

The tool holder 10 is formed into a substantially cuboid, and the tool insertion opening 20 is formed so as to extend in a direction along the rotation axis P of the turret 1. An attachment shaft of the tool is inserted into the tool insertion opening 20 and fixed. Instead of the tool insertion opening 20, for the tool attachment mechanism, another tool attachment mechanism can be included, such as an external diameter turning holder, which holds a tool by sandwiching a turning bit at a depression.

Figure 2:
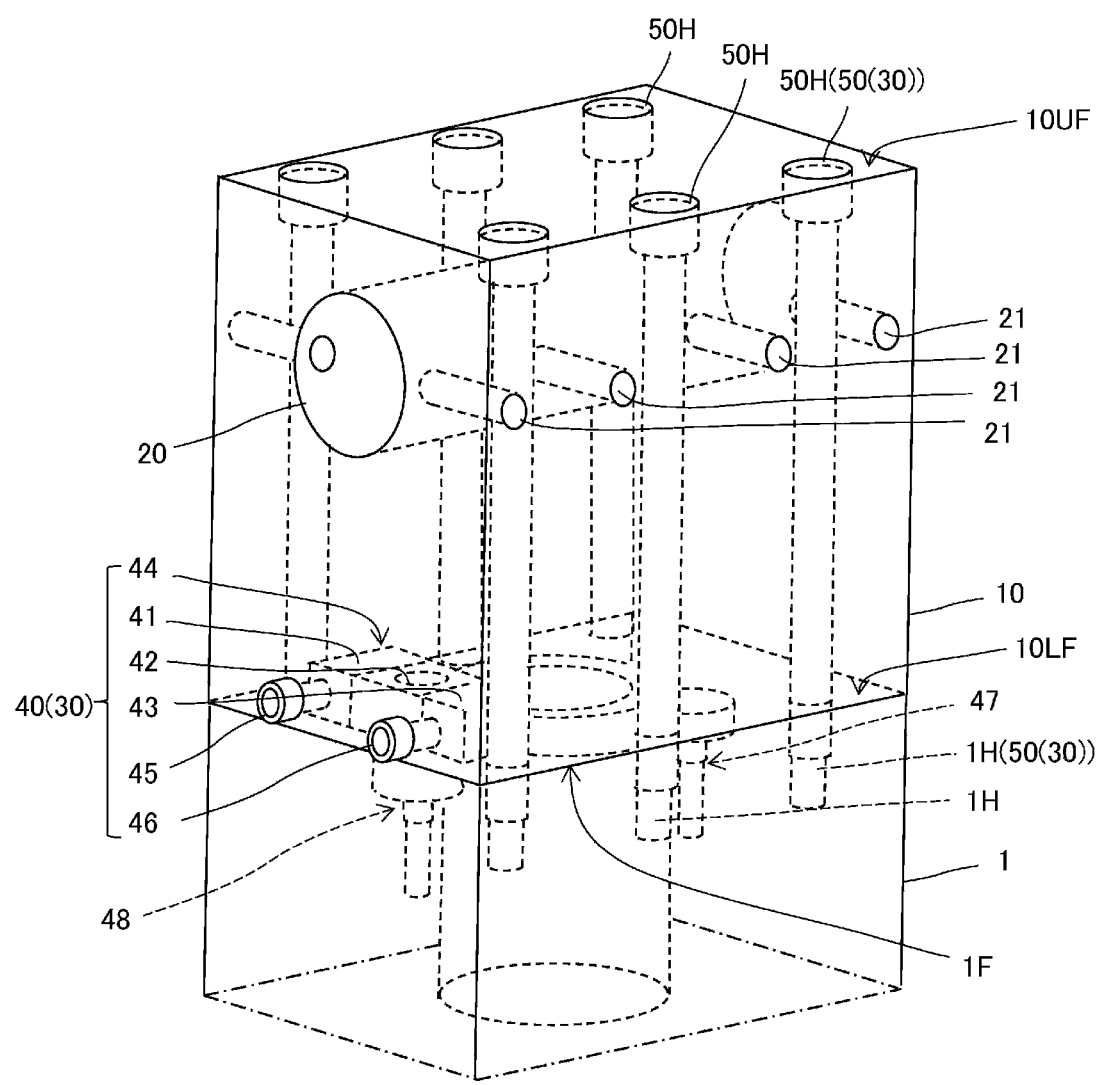
FIG. 2 illustrates an overall configuration including a mechanism for attaching a tool holder to a turret.

FIG. 2 shows a configuration of a tool holder 10 attached to the attachment face 1F of the turret 1. For the attachment mechanism 30 for attaching the tool holder 10 to the turret 1, the tool holder 10 includes an angle adjustment mechanism 40, which adjust an attachment angle of the tool holder 10 to the turret 1, that is, an angle formed between the rotation axis P (ref: FIG. 1) of the turret 1 and the axis of the tool attached to the tool holder 10 in plan view; and a fixing mechanism 50 that fixes the tool holder 10 to the turret 1.

The fixing mechanism 50 is composed of six screw holes 1H drilled perpendicularly to the attachment face 1F at a peripheral portion of the attachment face 1F of the turret 1, six screw holes 50H formed so as to penetrate from the upper face 10UF to the lower face 10LF of the tool holder 10 in correspondence to the respective screw holes 1H, and hexagon socket bolts screwed into both screw holes 50H, 1H.

Four pairs of the screw holes 21 are formed at both faces sandwiching the tool insertion opening 20 included in the tool holder 10, and are reaching the tool insertion opening 20. The shaft of the tool is inserted into the tool insertion opening 20, and hexagon socket hollow set screws are screwed from the screw holes 21 to fix the tool.

The angle adjustment mechanism 40 includes an angle adjustment block 42, first and second adjustment blocks 41 and 43 disposed to sandwich the angle adjustment block 42 in plan view, and a depression 44 that is formed in the tool holder 10 and accommodates the angle adjustment block 42 and the first and second adjustment blocks 41, 43.

Furthermore, the angle adjustment mechanism 40 includes a first and second adjusters 45, 46 that move the first and second adjustment blocks 41 and 43, a first positioning member 47 conducting the positioning between the turret 1 and the tool holder 10, and a second positioning member 48 conducting the positioning between the turret 1 and the angle adjustment block 42.

Figure 3:
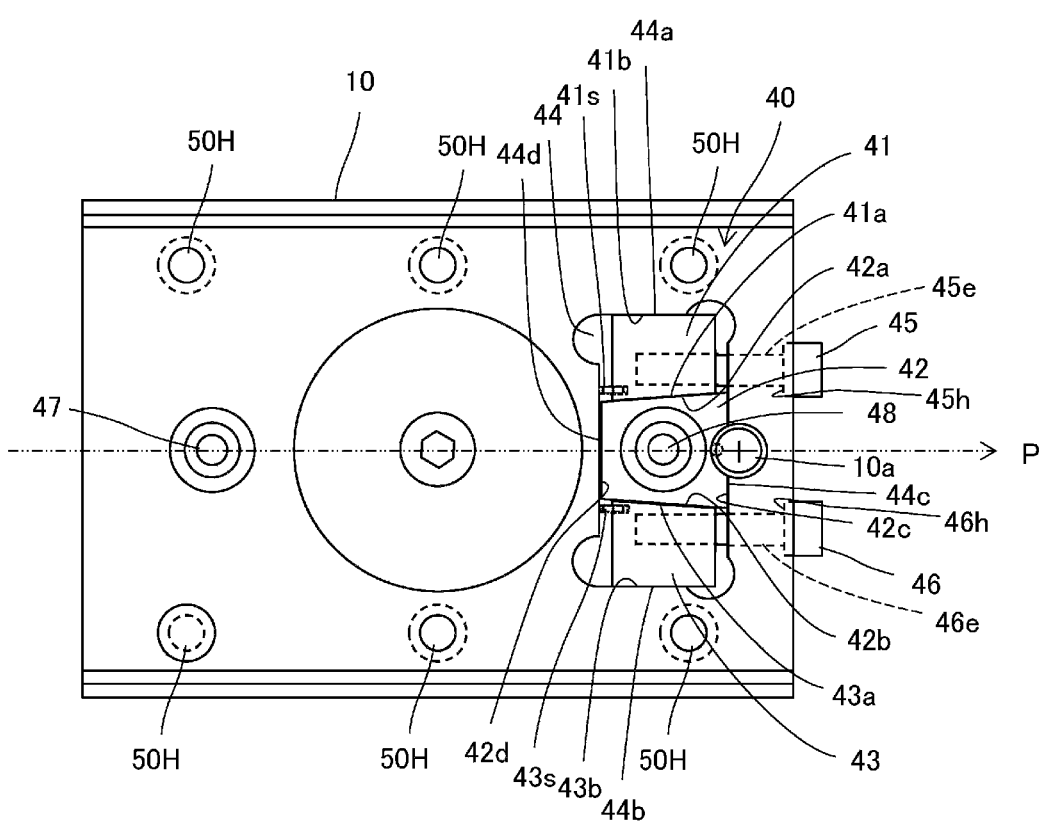
FIG. 3 illustrates the angle adjustment mechanism and the tool holder seen from the bottom.

As shown in FIG. 3, the angle adjustment block 42 is composed of a prism including first opposing side faces 42a, 42b inclined relative to the direction along the rotation axis P (ref: FIG. 1) of the turret 1 in plan view, and second opposing side faces 42c, 42d parallel to each other.

The first adjustment block 41 and the second adjustment block 43 are disposed to sandwich the angle adjustment block 42 in plan view, include inclined faces 41a, 43a making surface contact with the first opposing side faces 42a, 42b of the angle adjustment block 42, respectively, and are composed of prisms disposed movably in the direction along the rotation axis P of the turret 1 in plan view.

The depression 44 formed in the tool holder 10 is configured so that the angle adjustment block 42 is movable. The depression 44 includes guide faces 44c, 44d and a pair of guide faces 44a, 44b: the guide faces 44c, 44d oppose one of the second opposing side faces 42c, 42d of the angle adjustment block 42. The first and second adjustment blocks 41, 43 are movable while the pair of guide faces 44a, 44b are in contact with the opposing faces 41b, 43b of the inclined faces 41a, 43a of the first and second adjustment blocks 41, 43. The first and second adjustment blocks 41, 43 are movable in the direction crossing the arrangement direction of the first and second adjustment blocks 41, 43, in this embodiment, the direction along the rotation axis P of the turret 1. In this embodiment, a configuration is made so that the second opposing side face 42c of the angle adjustment block 42 moves along the guide face 44c.

The first adjuster 45 is composed of a manually operable position adjustment screw, which allows the first adjustment block 41 to move in directions along the rotation axis P of the turret 1 while the angle adjustment block 42 and the first and second adjustment blocks 41, 43 are accommodated in the depression 44.

Similarly, the second adjuster 46 is composed of a manually operable position adjustment screw, which allows the second adjustment block 43 to move in directions along the rotation axis P of the turret 1 while the angle adjustment block 42 and the first and second adjustment blocks 41, 43 are accommodated in the depression 44.

That is, the second opposing side face of the angle adjustment block 42 includes a first guide face 42c and a second guide face 42d in an orthogonal posture relative to the rotation axis P of the turret 1 in plan view, and the first opposing side face includes a first inclined face 42a and a second inclined face 42b inclined in opposite directions in plan view between the first guide face 42c and the second guide face 42d.

The first adjustment block 41 includes a third opposing side face composed of a third inclined face 41a relatively movable while in surface contact with the first inclined face 42a of the angle adjustment block 42, and a third guide face 41b in a posture parallel with the rotation axis P of the turret 1.

Furthermore, the second adjustment block 43 includes a fourth opposing side face composed of a fourth inclined face 43a relatively movable while being in surface contact with the second inclined face 42b, and a fourth guide face 43b in a posture parallel with the rotation axis P of the turret 1.

The depression 44 includes a fifth guide face 44c opposing the first guide face 42c of the angle adjustment block 42, a sixth guide face 44d opposing the second guide face 42d of the angle adjustment block 42, a seventh guide face 44a relatively movable while being in surface contact with the third guide face 41b of the first adjustment block 41, and an eighth guide face 44b relatively movable while being in surface contact with the fourth guide face 43b of the second adjustment block 43.

The above-described first and second adjusters 45, 46 are composed of hexagon socket male screws 45e, 46e to screw together with female screw portions formed in the first and second adjustment blocks 41, 43 through first and second adjustment holes 45h, 46h formed at one face of the tool holder 10, in this embodiment, formed at a front side face of the turret 1, and energizing mechanisms 41s, 43s are included: the energizing mechanisms 41s, 43s are composed of an elastic body such as a compression coil spring that energizes the first and second adjustment blocks 41, 43 along the seventh guide face 44a or the eighth guide face 44b toward the fifth guide face 44c.

Figure 4:
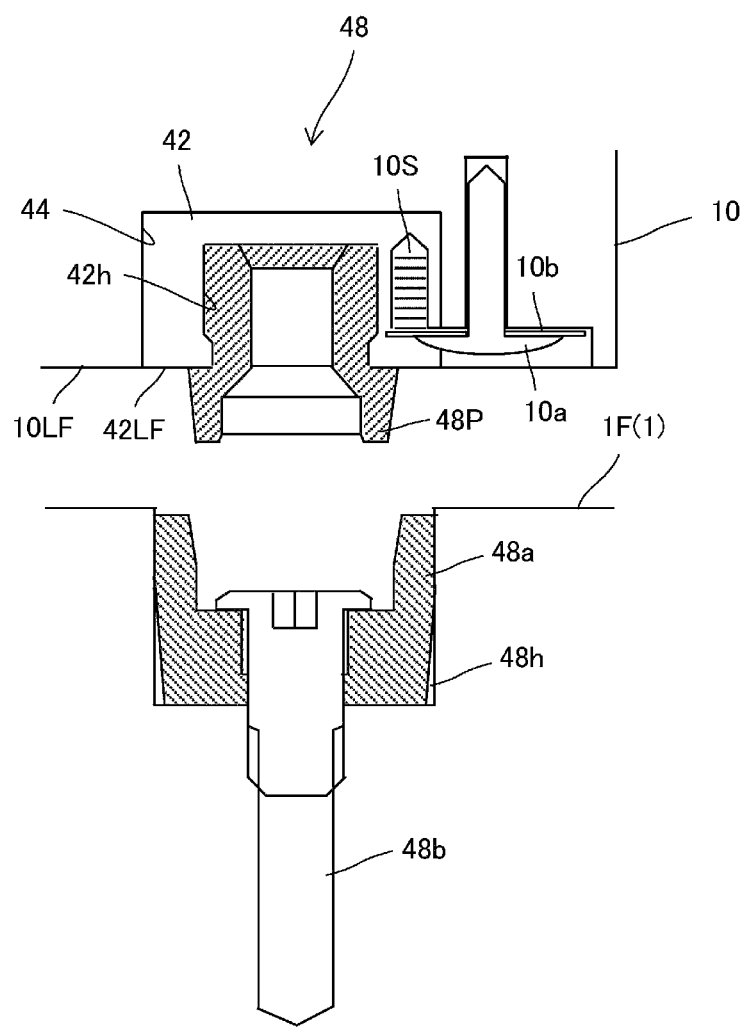
FIG. 4 illustrates a positioning mechanism included in the turret and tool holder, or the turret and angle adjustment mechanism.

FIG. 4 shows a cross sectional view seen in a direction orthogonal to the rotation axis P of the turret 1, showing a cross sectional view of a second positioning member 48 conducting positioning between the turret 1 and the angle adjustment block 42.

A locating ring 48a is embedded in a cylindrical depression 48h formed at the attachment face 1F of the turret 1, and the locating ring 48a is tightened and fixed to the turret 1 using a bolt 48b.

In a cylindrical depression 42h formed at the lower face 42LF of the angle adjustment block 42, that is, at a face opposing the attachment face 1F of the turret 1, a locating pin 48P is embedded, with the distal end thereof projecting from the lower face 42LF.

To prevent removal from the depression 44 of the angle adjustment block 42 accommodated in the depression 44 formed at the lower face 10LF of the tool holder 10, an elastic body 10s that compresses and energizes the angle adjustment block 42 upwardly from the lower face 10LF side, such as a compression coil spring is disposed, and the elastic body 10s is supported by a washer 10b held by a male screw 10a tightened and fixed to the tool holder 10.

At an inner circumferential face of the locating ring 48a, an inclined face with a gradually increasing diameter upwardly is formed, and at an outer circumferential face of the locating pin 48P, an inclined face with a gradually decreasing diameter downwardly is formed: the inclination angles of the both inclined faces are set to be equal.

Figure 5:
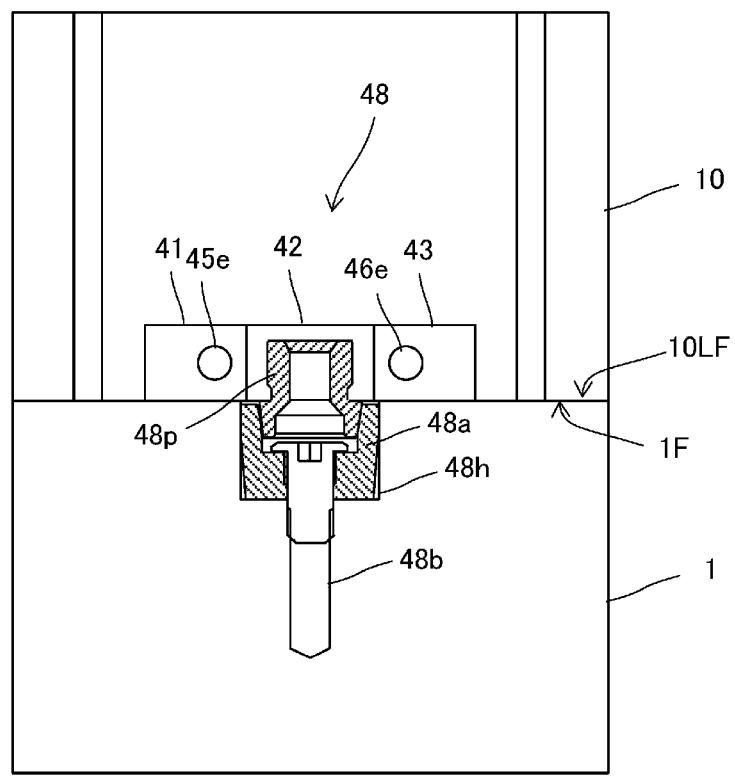
FIG. 5 illustrates a positioning mechanism included in the turret and tool holder, or the turret and angle adjustment mechanism, while executing positioning.

FIG. 5 is a cross sectional view seen from the direction along the rotation axis P of the turret 1, showing a cross sectional view illustrating a state in which the locating pin 48P is fitted in the locating ring 48a, and the angle adjustment block 42 and the turret 1 are positioned.

Similarly with the second positioning member 48, the first positioning member 47 conducting positioning between the turret 1 and the tool holder 10 as well is composed of a locating ring embedded in a cylindrical depression formed at the attachment face 1F of the turret 1, and a locating pin embedded in a cylindrical depression formed at the lower face 10LF of the tool holder 10 in a state in which its distal end is projected from the lower face 10LF.

While being positioned by the first and second positioning members 47, 48, and energized toward the fifth guide face 44c side with the respective energizing mechanisms 41s, 43s, by rotating the first and second adjusters 45, 46, the first and second adjustment blocks 41, 43 slide along the seventh guide face 44a and the eighth guide face 44b of the depression 44. By rotating the first and second adjusters 45, 46 in opposite directions, the angle adjustment block 42 moves in a direction orthogonal to the rotation axis P of the turret 1 in plan view.

Figure 6A:
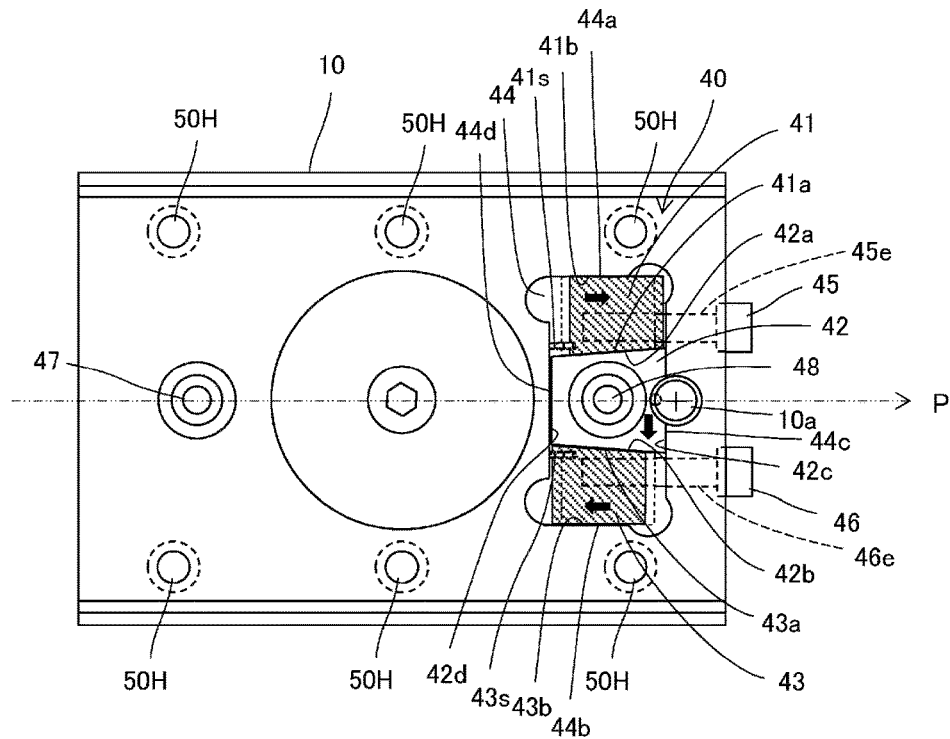
FIG. 6(a) and FIG. 6(b) illustrate positioning processes by the positioning mechanism.

As shown in FIG. 6(a), in plan view, by operating the first adjuster 45 to move the first adjustment block 41 to a front side of the tool holder 10, and by operating the second adjuster 46 to move the second adjustment block 43 to a rear side of the tool holder 10, the angle adjustment block 42 moves to a second adjustment block 43 side relative to the rotation axis P of the turret 1. The tool holder 10 and the angle adjustment block 42 are positioned relative to the turret 1 with the respective first and second positioning members 47, 48, the tool holder 10 moves in a direction opposite to the moving direction of the angle adjustment block 42, that is, it slightly rotates clockwise (counterclockwise in bottom view of the tool holder 10) around the axis of the first positioning member 47 in plan view. In FIG. 6(a), the hatched blocks show the position of the first and second adjustment blocks 41, 43 after position adjusted with the first and second adjusters 45, 46, and their original positions are shown with broken lines.

Figure 6B:
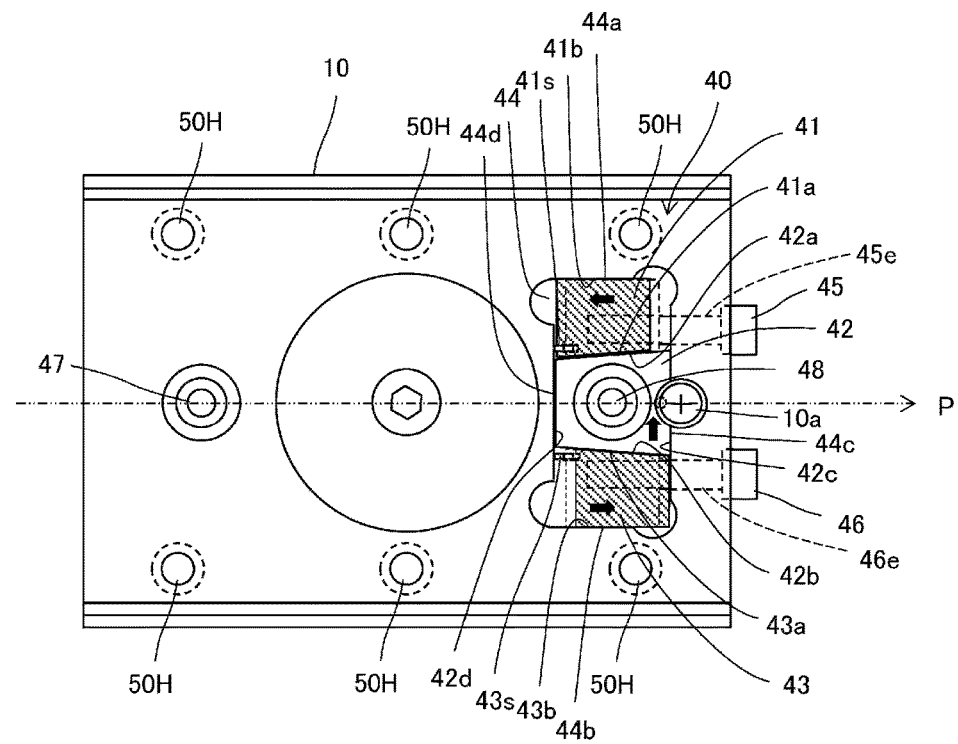

As shown in FIG. 6(b), in plan view, by operating the first adjuster 45 to move the first adjustment block 41 to a rear side of the tool holder 10, and by operating the second adjuster 46 to move the second adjustment block 43 to a front side of the tool holder 10, the angle adjustment block 42 moves to a first adjustment block 41 side relative to the rotation axis P of the turret 1. The tool holder 10 and the angle adjustment block 42 are positioned relative to the turret 1 with the respective first and second positioning members 47, 48, the tool holder 10 moves in a direction opposite to the moving direction of the angle adjustment block 42, that is, it slightly rotates counterclockwise (clockwise in bottom view of the tool holder 10) around the axis of the first positioning member 47 in plan view. In FIG. 6(b), the hatched blocks show the position of the first and second adjustment blocks 41, 43 after position adjusted with the first and second adjusters 45, 46, and their original positions are shown with broken lines.

In this manner, the mounting posture of the tool holder 10 relative to the turret 1 can be fine-tuned so that the axis of the tool insertion opening 20 included in the tool holder 10 is along the rotation axis P of the turret 1.

The above-described processes of adjustment relative to the tool holder 10 do not have to be conducted when the tool holder 10 is attached to the turret 1. The tool holder 10 can be attached to the actual turret 1 after it is positioned and fixed to the first and second positioning members 47, 48 included in an attaching face of an adjustment jig mocking the turret 1, and the first and second adjusters 45, 46 are rotated to adjust the posture.

[Mechanism for Attaching Tool Holder to Turret in Another Embodiment 1]

In Embodiment described above, the configuration is made with an isosceles trapezoid prism in plan view for the angle adjustment block 42, with which the inclination angles of the first inclined face 42a and third inclined face 41a, and the second inclined face 42b and fourth inclined face 43a are set so that the first guide face 42c of the second opposing side faces of the angle adjustment block 42 makes contact with the fifth guide face 44c of the depression 44 to slide. However, the present disclosure is not limited to such an embodiment, and a configuration can be made so as to set the inclination angles of the first inclined face 42a of the angle adjustment block 42 and the third inclined face 41a of the first adjustment block 41, and the second inclined face 42b of the angle adjustment block 42 and the fourth inclined face 43a of the second adjustment block 43 to be opposite of the above describe one, so that the second guide face 42d of the second opposing side faces of the angle adjustment block 42 makes contact with the sixth guide face 44d of the depression 44 formed in the tool holder 10 to slide.

In this case, energizing mechanisms 41s, 43s composed of an elastic body such as a compression coil spring that energizes the first and second adjustment blocks 41, 43 toward the sixth guide face 44d along the seventh guide face 44a or eighth guide face 44b can be included.

Furthermore, instead of the pull-in screw used in the previous embodiment as the first and second adjusters 45, 46, push-in screws such as hollow set screws can be used.

The angle adjustment block 42 does not have to be composed of an isosceles trapezoid prism in plan view, and the inclination angles of the first inclined face 42a and third inclined face 41a, and the second inclined face 42b and fourth inclined face 43a can be set to be different angles.

[Mechanism for Attaching Tool Holder to Turret in Another Embodiment 2]

Figure 7:
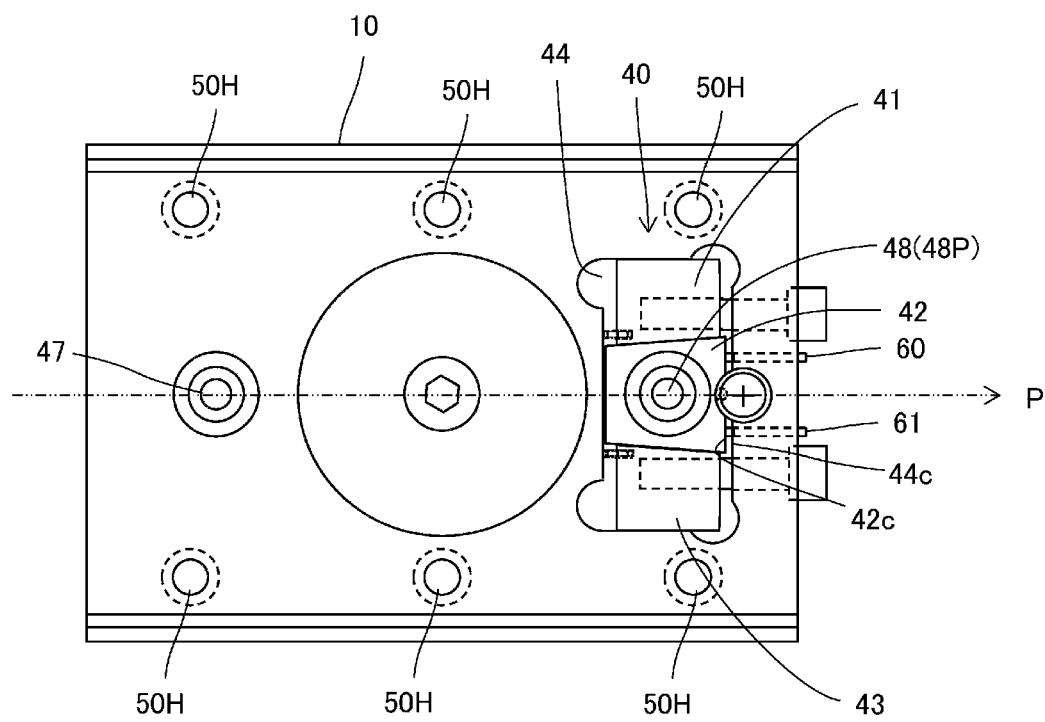
FIG. 7 illustrates the mechanism for attaching a tool holder to a turret in another embodiment.

As shown in FIG. 7, a configuration can be made so as to attach the hollow set screws 60, 61 to project from the fifth guide face 44c of the depression 44 formed in the tool holder 10 to adjust relative position of the first guide face 42c of the angle adjustment block 42 relative to the fifth guide face 44c, to fine-tune the position of the locating pin 48P of the second positioning member 48.

That is, in the position adjustment mechanism, with the hollow set screws 60, 61, the angle adjustment block 42 is pressed from the fifth guide face 44c side to fine-tune the position of the second positioning member 48.

[Mechanism for Attaching Tool Holder to Turret in Another Embodiment 3]

Figure 8:
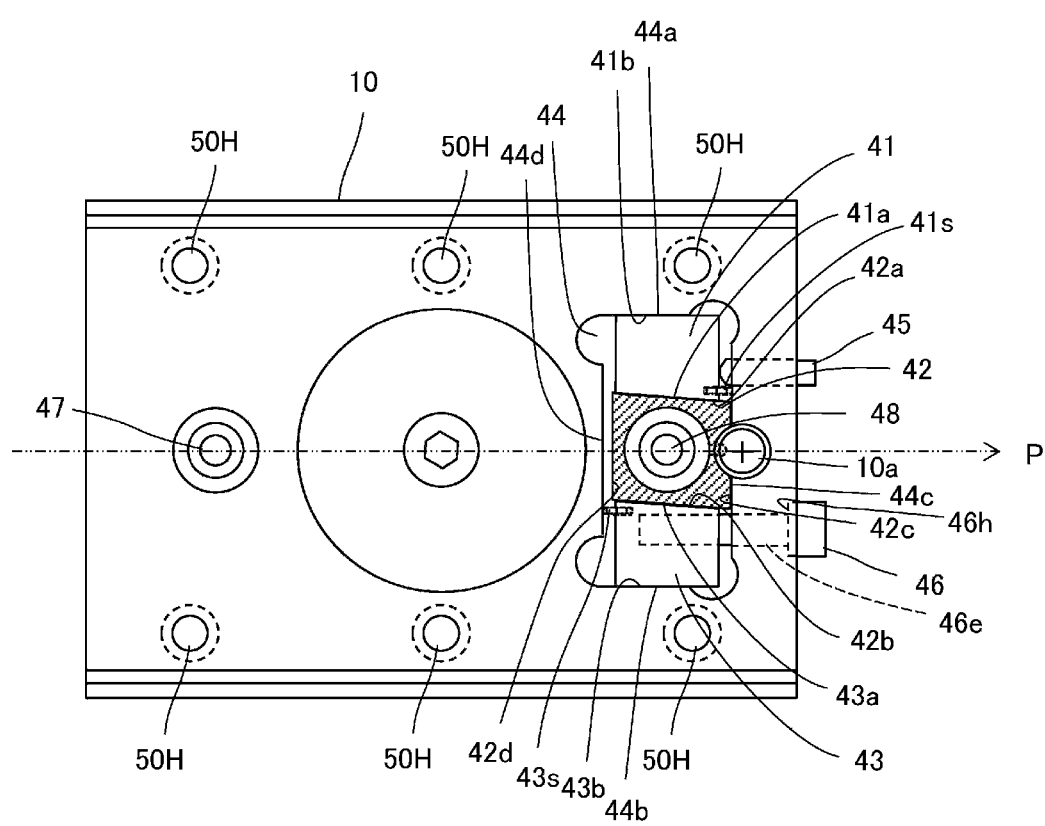
FIG. 8 illustrates the mechanism for attaching a tool holder to a turret in another embodiment.

As shown in FIG. 8, a configuration can be made so that the angle adjustment block 42 is a prism of a parallelogram in plan view with the inclination direction of the inclined faces 41a, 43a formed in the first and second adjustment blocks 41, 43 are the same, and the respective inclined faces 41a, 43a and the first opposing side faces 42a, 42b of the angle adjustment block 42 are brought into surface contact with each other (in FIG. 8, the block shown with hatching is angle adjustment block).

In this case, the energizing mechanism 41s for the first adjustment block 41 has to be set in an opposite direction relative to the previous embodiments. For the first adjuster 45, instead of pull-in screws, push-in screws such as the hollow set screw can be used.

[Mechanism for Attaching Tool Holder to Turret in Another Embodiment 4]

Figure 9:
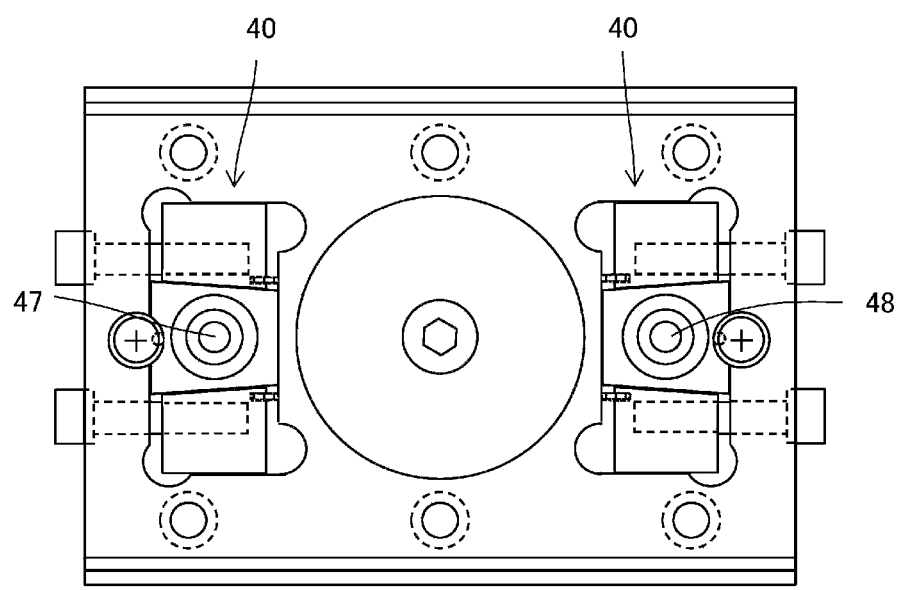
FIG. 9 illustrates the mechanism for attaching a tool holder to a turret in another embodiment.
Figure 10A:
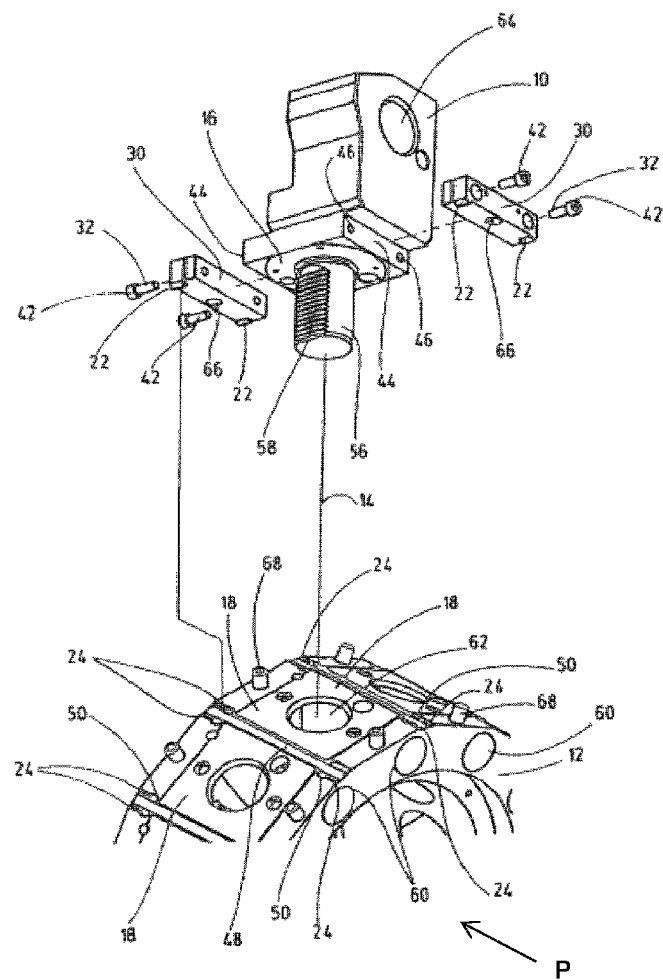
FIGS. 10 (a) and (b) illustrate a conventional mechanism for attaching a tool holder to a turret.
Figure 10B:
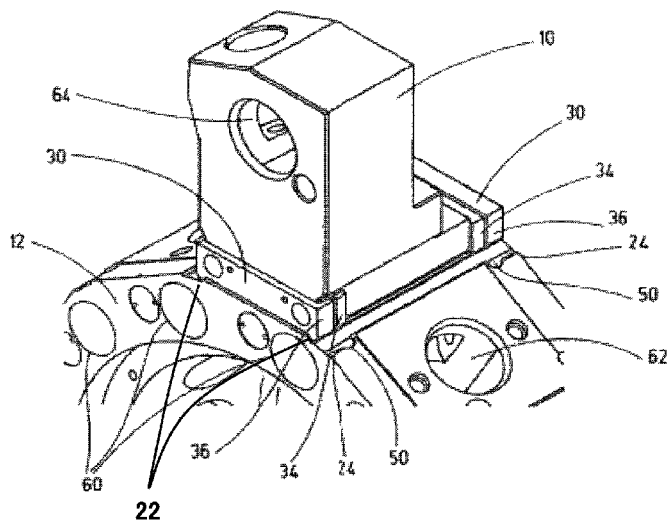
Figure 11A:
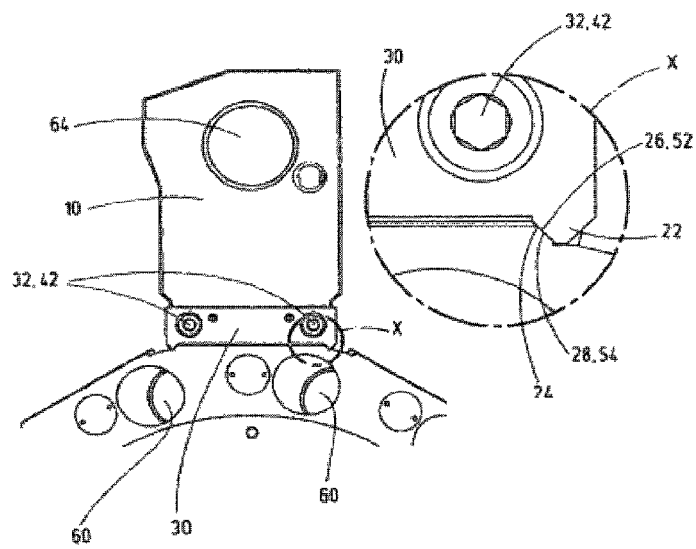
FIGS. 11 (a), (b), and (c) illustrate a conventional mechanism for attaching a tool holder to a turret.
Figure 11B:
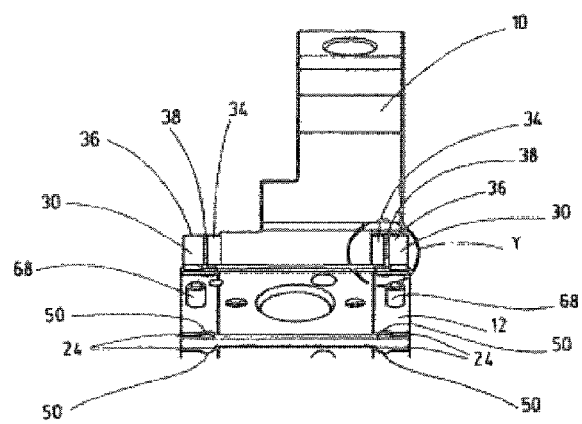
Figure 11C:
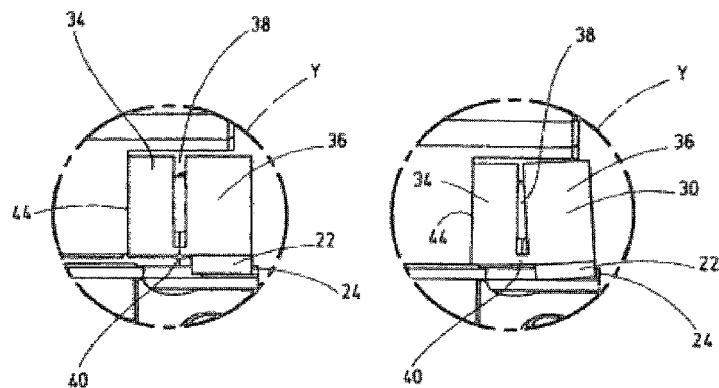

As shown in FIG. 9, a configuration can be made so as to provide a pair of angle adjustment mechanisms 40 of any of the above embodiments along the direction parallel to the rotation axis P of the turret 1 in the tool holder 10, to use the first positioning member 47 also as the second positioning member 48. In this case, in addition to enabling fine-tuning of the attachment posture of the tool holder 10 relative to the turret 1, so that the axis of the tool insertion opening 20 included in the tool holder 10 in plan view to be in line with the rotation axis P of the turret 1, the tool holder 10 can be moved in parallel to be in line with the rotation axis P of the turret 1. In this case, first and second adjustment holes in correspondence with one angle adjustment mechanism 40 are formed at the front side face of the turret, and first and second adjustment holes in correspondence with the other angle adjustment mechanism 40 are formed at the rear side face of the turret 1.

The above described first and second positioning members 47, 48 can be of a configuration in which a depression and a projection are included: in an object to be positioned, the depression having a circle shape in cross sectional view and included at one attachment face side and the projection having a circle shape in cross sectional view and included at the other attachment face side to be fit in the depression, and the configuration is not limited to the one composed of a locating ring and a locating pin.

Although embodiments and aspects of the present disclosure are described above, the contents of the disclosure may be varied in details of the configurations, and combinations of the elements, change in order, and the like can be achieved without deviation from the claimed scope and principles of the present invention.

Although preferred embodiments of the present disclosure at this point in time are described, it is to be understood that such disclosure is not to be interpreted as limiting. Various alterations and modifications will no doubt become apparent to those skilled in the art to which the present invention pertains after they read the disclosure described above. Accordingly, it is intended that the appended claims be interpreted as covering all alterations and modifications while not deviating from the true spirit and scope of the present invention.

INDUSTRIAL APPLICABILITY

As described above, the present disclosure allows a machine tool with a mechanism for attaching a tool holder to a turret that easily achieves highly precise angle adjustment.

DESCRIPTION OF REFERENCE NUMERALS

1: turret
1F: attachment face
10: tool holder
20: tool insertion opening
30: attachment mechanism
40: angle adjustment mechanism
47: first positioning member
48: second positioning member
41: first adjustment block
41a: inclined face (third inclined face)
41b: opposing face (third guide face)
42: angle adjustment block
42a, 42b: first opposing side face
42c, 42d: second opposing side face
43: second adjustment block
43a: inclined face (fourth inclined face)
43b: opposing face (fourth guide face)
44: depression
44a: seventh guide face
44b: eighth guide face
44c: fifth guide face
44d: sixth guide face
50: fixing mechanism
P: rotation axis

The invention claimed is:

1. A mechanism for attaching a tool holder to a turret, the mechanism comprising an angle adjustment mechanism, and a fixing mechanism that fixes the tool holder to the turret, wherein the angle adjustment mechanism comprises:
   an angle adjustment block composed of a prism including first opposing side faces inclined relative to a direction along the rotation axis of the turret in plan view, and second opposing side faces parallel to each other;
   first and second adjustment blocks disposed to sandwich the angle adjustment block in plan view, include inclined faces that are brought into surface contact with respective first opposing side faces, and composed of prisms that are movable in directions along the rotation axis of the turret,
   a depression formed in the tool holder, configured so that the angle adjustment block is movable, and includes a guide face opposing one of the second opposing side faces of the angle adjustment block, and a pair of guide faces with which the first and second adjustment blocks are movable in a direction crossing an arrangement direction of the first and second adjustment blocks while being in contact with the opposing faces of the inclined faces of the first and second adjustment blocks,
   first and second adjusters that move the first and second adjustment blocks in a direction along the rotation axis of the turret while the angle adjustment block and the first and second adjustment blocks are accommodated in the depression, and
   a first positioning member conducting positioning between the turret and the tool holder, and a second positioning member conducting positioning between the turret and the angle adjustment block.

2. The mechanism for attaching a tool holder to a turret of claim 1, wherein
   in the angle adjustment block, the second opposing side faces include a first guide face and a second guide face that are orthogonally oriented relative to the rotation axis of the turret in plan view, and the first opposing side faces include a first inclined face and a second inclined face that incline in opposite directions between the first guide face and the second guide face,
   the first adjustment block includes a third opposing side face including a third inclined face relatively movable while being in surface contact with the first inclined face, and a third guide face parallelly oriented relative to the rotation axis of the turret,
   the second adjustment block includes a fourth opposing side face including a fourth inclined face relatively movable while being in surface contact with the second inclined face, and a fourth guide face parallelly oriented relative to the rotation axis of the turret, and
   the depression includes a fifth guide face opposing the first guide face of the angle adjustment block, a sixth guide face opposing the second guide face of the angle adjustment block, a seventh guide face relatively movable while being in surface contact with the third guide face of the first adjustment block, and an eighth guide face relatively movable while being in surface contact with the fourth guide face of the second adjustment block.

3. The mechanism for attaching a tool holder to a turret of claim 2, wherein
   the first and second adjusters are configured with a female screw portion and a male screw, wherein the female screw portion is formed at the first and second adjustment blocks, and the male screw is screwed in the female screw portion through first and second adjustment holes formed at one face of the tool holder; and
   an energizing mechanism that energizes the first and second adjustment blocks in a direction along the seventh guide face or eighth guide face is included.

4. The mechanism for attaching a tool holder to a turret of claim 3, wherein
   the one face of the tool holder where the first and second adjustment holes are formed corresponds to a front face or a rear face of the turret.

5. The mechanism for attaching a tool holder to a turret of claim 1, wherein
   a pair of the angle adjustment mechanisms are provided in the tool holder along a direction parallel to the rotation axis of the turret, and
   the first positioning member also works as the second positioning member.

6. The mechanism for attaching a tool holder to a turret of claim 1, wherein
   the first and second positioning members are composed of a depression and a projection: in an object to be positioned, the depression having a circle shape in cross sectional view and included at one attachment face side, and the projection having a circle shape in cross sectional view and included at the other attachment face side to be fit in the depression.

* * * * *